United States Patent [19]

Moncur

[11] Patent Number: 4,622,377

[45] Date of Patent: Nov. 11, 1986

[54] PLASTIC TRANSPARENCY AND METHOD FOR MAKING IT

[75] Inventor: Marlowe V. Moncur, Irvine, Calif.

[73] Assignee: Swedlow, Inc., Garden Grove, Calif.

[21] Appl. No.: 821,123

[22] Filed: Jan. 21, 1986

Related U.S. Application Data

[63] Continuation of Ser. No. 652,861, Sep. 20, 1984, abandoned.

[51] Int. Cl.$^4$ ............................................. C08F 20/20
[52] U.S. Cl. ............................... 526/323.2; 264/290.2
[58] Field of Search ............... 526/329.7, 323.1, 323.2; 264/290.2

[56] References Cited

U.S. PATENT DOCUMENTS

| | | |
|---|---|---|
| 3,219,610 | 11/1965 | Tillson . |
| 3,362,942 | 1/1968 | Munn . |
| 3,380,980 | 4/1968 | Calkins et al. . |
| 3,470,126 | 9/1969 | Sekmakas et al. . |
| 4,113,803 | 9/1978 | Price . |
| 4,152,506 | 5/1979 | Novak . |
| 4,174,336 | 11/1979 | Leiner et al. . |
| 4,180,640 | 12/1979 | Melody et al. . |
| 4,214,064 | 7/1980 | Kanazawa . |
| 4,229,549 | 10/1980 | Usami et al. . |
| 4,269,959 | 5/1981 | Lawton . |
| 4,319,015 | 3/1982 | Struver et al. . |
| 4,331,795 | 5/1982 | Ukita et al. . |
| 4,505,972 | 3/1985 | Moore .............................. 526/329.7 |

OTHER PUBLICATIONS

A Comparison of "Stretched" and Pressed Acrylic Materials from Various Sources, by K. B. Armstrong, British Airways, pp. 459–531.

Problems Associated with the Quality Assurance of Stretch Acrylic Sheet, by R. L. Worsdall, MOD (P.E.) M.Q.A.D., pp. 371–397.

Crazing in Aircraft Transparencies: Problems for Pilots with Bird-Impact Resistant Transparencies, by Peter J. Burchill and Richard H. Stacewicz, Materials Research Laboratories, Melbourne, Victoria, Australia.

Effect of Water on the Crazing of a Crosslinked Poly(-Methlymethacrylate), by P. J. Burchill and R. H. Stacewicz, Materials Research Laboratories, Defence Science and Technology Organization, Melbourne 3032, Australia.

The Effect of Absorbed Water on the Thermal Relaxation of Stretched Acrylic Polymer Transparency Materials, by J. M. Barton, Royal Aircraft Establishment, Farnborough.

The Effects of Absorbed Moisture Upon the Physical Properties of Stretched Acrylic Materials, by A. J. Mason, British Aerospace-Aircraft Group, Materials Laboratory, Weybridge-Bristol Division.

Cross-linked Polymers. I. Factors Influencing the Efficiency of Cross-linking in Copolymers of Methyl Methacrylate and Glycol Dimethacrylates, by S. Loshaek and T. G. Fox, received Mar. 18, 1953, (Contribution from the Research Laboratory of the Rohm and Haas Company), vol. 75, pp. 3544–3550.

SR-248, 2,2-Dimethyl Propane Dimethacrylate, by Sartomer Company, Division of Sartomer Industries, Inc., West Chester, Pennsylvania.

Primary Examiner—Paul R. Michl
Attorney, Agent, or Firm—Pretty, Schroeder, Brueggemann & Clark

[57] ABSTRACT

A plastic transparency, and method for making it, that is the polymerization product of at least 97.5 mole percent of a monofunctional, vinyl monomer, of which at least 70 percent and preferably 100 percent is methyl methacrylate, and up to 2.5 mole percent neopentylene glycol dimethacrylate. The transparency exhibits significantly reduced optical hazing in an acidic environment, making it particularly suitable for use as an aircraft transparency.

26 Claims, No Drawings

PLASTIC TRANSPARENCY AND METHOD FOR MAKING IT

This application is a continuation, of application Ser. No. 652,861, filed 9/20/84, now abandoned.

BACKGROUND OF THE INVENTION

This invention relates generally to plastic transparencies, and, more particularly, to plastic transparencies suitable for use in an acidic environment.

Plastic transparencies comprised primarily of polymethyl methacrylate are used in numerous applications where light weight, strength, and optical clarity are required. One major application of such transparencies is in aircraft. In such aircraft applications, optical hazing due to cracking and crazing of the transparency's exposed surface is a significant problem. Many environmental factors such as humidity are believed to aggravate this problem.

It has recently been theorized that sulfuric acid in the air aggravates the optical hazing problem in such aircraft transparencies. This acid is believed to result from the significant amounts of sulfur dioxide released into the atmosphere by volcanic activity around the world. The sulfur dioxide reacts with water vapor in the air to produce minute droplets of sulfuric acid. The acid droplets adhere to the exposed aircraft surfaces, and may be preferentially attracted to plastic transparency surfaces due to their static charge. The acid acts as a solvent or plasticizer to soften the plastic surface.

Tests have shown that sulfuric acid severely attacks acrylic transparencies presently in general use in aircraft. There is therefore a need for an improved composition for transparencies of this kind, which is more resistant to acid attack. The present invention fulfills this need.

SUMMARY OF THE INVENTION

The present invention is embodied in an improved composition for a plastic transparency that is highly resistant to attack from acid and that therefore retains its optical clarity for a much longer duration in an acidic environment. In accordance with the invention, the transparency consists essentially of the polymerization product of at least 97.5 mole percent of a monofunctional vinyl monomer, of which at least 70 percent is methyl methacrylate, and up to 2.5 mole percent neopentylene glycol dimethacrylate. Transparent sheets formed of this composition exhibit improved acid resistance both in an as-cast (i.e., unstretched) condition and in a stretched condition. When unstretched, the transparency preferably includes about 2.0 mole percent of the dimethacrylate copolymer, whereas when stretched in the typical amount of 70 percent, the transparency preferably includes only about 0.8 mole percent of the dimethacrylate copolymer. Also preferred are transparencies from sheets stretched from 30 to 70 percent and including 0.8 to 2.0 mole percent of the dimethacrylate comonomer. The monofunctional vinyl monomer preferably consists essentially entirely of methyl methacrylate.

Transparencies formed of this composition are particularly useful in aircraft applications, where they frequently are exposed to minute droplets of sulfuric acid. The increased resistance of these transparencies to such sulfuric acid greatly delays the onset of any acid-induced softening of the exposed surfaces and the resulting optical hazing.

Transparencies may be monolithic, incorporating only this composition, or may be multilayer, laminated structues in which this composition is the outer, exposed ply. Other transparent materials that may be incorporated into such a laminate structure include polycarbonate, polyvinyl butyral, polyurethanes, silicones and conventional acrylic materials.

Other aspects and advantages of the present invention will become apparent from the following description of the preferred embodiment, which illustrates the principles of the invention.

DESCRIPTION OF THE PREFERRED EMBODIMENT

This invention is embodied in an improved optical transparency, and a method for making it, which has substantially increased resistance to acid attack. In an acidic environment, the transparency exhibits substantially reduced amounts of surface softening and stress crazing, and thus optical hazing, making it particularly suitable for use as an aircraft transparency. Minute droplets of sulfuric acid, possibly resulting from the reaction of water vapor with sulfur dioxide released into the atmosphere by volcanic activity, is believed to cause significant optical hazing problems in existing aircraft transparencies.

In accordance with the invention, the optical transparency consists essentially of the polymerization product of at least 97.5 mole percent of a monofunctional vinyl monomer, of which at least 70 percent, and preferably 100 percent, is methyl methacrylate, and up to 2.5 mole percent neopentylene glycol dimethacrylate. Transparencies formed of this composition offer surprisingly high resistance to acid attack and thus should substantially increase the average service life of aircraft windows. The transparency's acid resistance is surprisingly better than that of other acrylic compositions, including those formed with other dimethacrylate comonomers.

The improved acid resistance of the optical transparency of the invention is shown by the examples described below. In each case, a 0.250 inch thick cast acrylic sheet was prepared using conventional cell casting techniques. The composition of each example is listed in Table 1.

Examples 1 and 2 are alternative embodiments of the invention, one including the neopentylene glycol dimethacrylate comonomer in a concentration of 0.8 mole percent and the other including the same comonomer in a concentration of 2.0 mole percent. Examples 3–5 are comparative examples, which include other dimethacrylate comonomers, all in a concentration of 2.0 mole percent. Examples 6 and 7 are conventional acrylic sheets, formed in accordance with MIL-P-8184 and MIL-P-5425, respectively. MIL-P-8184 acrylic sheets include a methacrylamide/formaldehyde crosslinker system, whereas MIL-P-5425 sheets are essentially non-crosslinked polymethyl methacrylate homopolymers.

All seven samples were immersed in 70 percent by weight sulfuric acid for 168 hours (i.e., seven days) and were then evaluated for percent haze using the conventional method described in ASTM-D-1003. The results of these haze tests are tabulated in Table 1.

TABLE 1

| Example | Weight Percent Methyl Methacrylate | Comonomer Name | Comonomer Weight Percent | Comonomer Mole Percent | Haze Percent |
| --- | --- | --- | --- | --- | --- |
| 1 | 98.0 | Neopentylene glycol dimethacrylate | 2.0 | 0.8 | 80.0 |
| 2 | 95.2 | Neopentylene glycol dimethacrylate | 4.8 | 2.0 | 14.6 |
| 3 | 96.1 | Ethylene glycol dimethacrylate | 3.9 | 2.0 | 68.4 |
| 4 | 95.6 | Butanediol dimethacrylate | 4.4 | 2.0 | 70.4 |
| 5 | 94.0 | Decanediol dimethacrylate | 6.0 | 2.0 | 42.0 |
| 6 | about 94.0 | Methacrylamide and Formaldehyde | about 6.0 | — | 100.0 |
| 7 | 100.0 | — | — | — | 100.0 |

All of the examples that include dimethacrylate comonomers (i.e, examples 1-5) exhibit less optical hazing following acid immersion than the two conventional acrylic samples (i.e., examples 6 and 7). Examples 1 and 2, which include the specified neopentylene glycol dimethacrylate comonomer of the invention, improve on them the most. Specifically comparing example 2 of the invention with the comparative examples 3-5, all of which include 2.0 mole percent of a dimethacrylate comonomer, the example of the invention exhibits only about one-third the optical hazing of the next best example, example 5. Although example 1 of the invention exhibits significantly more optical hazing than does example 2 of the invention, it includes significantly less of the specified comonomer and such a drop-off in performance would therefore be expected. For comparison, the optical hazing of these sheets prior to acid treatment is typically about 0.5 percent.

The reduced optical hazing provided by the transparency of the invention is surprising because the particular dimethacrylate comonomer specified, i.e., neopentylene glycol dimethacrylate, does not appear to have any unique properties that would lead one to use it for this purpose. In fact, it would be expected that this particular dimethacrylate comonomer would improve optical hazing resistance only to an extent that is comparable with the improvement provided by the other dimethacrylate comonomers when incorporated at the same concentration. This is because the specified dimethacrylate includes five carbon atoms situated between two methacrylate groups, whereas the dimethacrylate comonomers of examples 3-5 include 2, 4 and 10 so-situated carbon atoms, respectively.

Biaxial stretching is a common technique used to improve the strength of acrylic transparencies. The presence of the dimethacrylate comonomer in the transparency, however, limits the maximum amount of stretching that can be effected. The maximum limits on biaxial stretching, as a function of the concentration of the dimethacrylate comonomer, is shown in Table 2.

For transparency applications where biaxial stretching is not required, a concentration of the neopentylene glycol dimethacrylate comonomer of about 2.0 mole percent is preferred. This corresponds to the transparency of example 2. This material can be biaxially stretched, but only to about 50 percent. In the common application where a 70 percent biaxial stretch is required, on the other hand, a dimethacrylate concentration of just 0.8 mole percent is preferred. This corresponds to the transparency of example 1. Since a transparency having this comonomer concentration can be stretched up to a maximum of 80 percent, this provides an adequate safety margin of 10 percent.

Stretched versions of examples 1 and 2 (stretched 70 and 50 percent, respectively), as well as of the comparative example 6 (stretched 70 percent), also were immersed in sulfuric acid for 48 hours. The stretched version of example 6 conforms to MIL-P-25690. This test revealed similar reductions in optical hazing to that demonstrated in Table 1, for unstretched samples.

The transparencies described above may be monolithic, incorporating only the specified composition, or may be multilayer, laminated structures in which the sheet incorporating the specified composition is the outer, exposed ply. Other transparent materials that may be included in such a laminated structure include polycarbonate, polyvinyl butyral, polyurethanes, silicones and conventional acrylic.

It should be apparent from the foregoing description that the present invention provides an improved acrylic transparency, and method of making it, that is particularly resistant to acid attack. The transparency includes a comonomer of neopentylene glycol dimethacrylate, in concentrations of up to 2.5 mole percent. The transparency exhibits substantially reduced optical hazing when in an acidic environment, making it particularly suitable for use as an aircraft transparency.

Although the invention has been described in detail with particular reference to the preferred embodiment, it will be understood by those of ordinary skill in the art

TABLE 2

| Example | Weight Percent Methyl Methacrylate | Weight Percent Neopentylene glycol dimethacrylate | Mole Percent Neopentylene glycol dimethacrylate | Maximum Percent Stretch |
| --- | --- | --- | --- | --- |
| 6 | 100. | 0.0 | 0. | 100. |
| 7 | 99. | 1.0 | 0.4 | 100. |
| 1 | 98. | 2.0 | 0.8 | 80. |
| 8 | 97. | 3.0 | 1.3 | 70. |
| 9 | 96. | 4.0 | 1.7 | 60. |
| 10 | 95. | 5.0 | 2.1 | 50. |
| 11 | 94. | 6.0 | 2.6 | 45. | that various modifications can be made without departing from the invention. Accordingly, the invention is limited only by the following claims.

I claim:

1. A transparent sheet consisting essentially of the polymerization product of at least 97.5 mole percent of monofunctional vinyl monomer, of which at least 70 percent is methyl methacrylate, and 0.4 to 2.5 mole percent neopentylene glycol dimethacrylate, wherein the sheet is biaxially stretched to improve its physical strength.

2. A transparent sheet as defined in claim 1, wherein:
   the sheet is biaxially stretched by about 70 percent; and
   the sheet consists essentially of the polymerization product of about 99.2 mole percent of the monofunctional vinyl monomer and about 0.8 mole percent of the neopentylene glycol dimethacrylate.

3. A transparent sheet as defined in claim 1, wherein:
   the sheet is biaxially stretched by about 50 percent; and
   the sheet consists essentially of the polymerization product of about 98.0 mole percent of the monofunctional vinyl monomer and about 2.0 mole percent of the neopentylene glycol dimethacrylate.

4. A transparent sheet as defined in claim 1, wherein the monofunctional vinyl monomer consists essentially entirely of methyl methacrylate.

5. A method of providing a transparent viewing panel for use in an acidic environment, comprising steps of:
   copolymerizing at least 97.5 mole percent of a monofunctional vinyl monomer, of which at least 70 percent is methyl methacrylate, and 0.4 to 2.5 mole percent neopentylene glycol dimethacrylate to produce a transparent sheet; and
   using the transparent sheet in an environment where acid is present, the sheet being resistant to acid attack such that optical hazing is minimized.

6. A method as defined in claim 5, wherein the step of using includes steps of:
   installing the transparent sheet in an aircraft; and
   flying the aircraft at an altitude and latitude where minute acidic droplets are present and contact the sheet.

7. A method as defined in claim 6, wherein the acidic droplets encountered in the step of flying include sulfuric acid caused by the reaction of sulfur dioxide with water vapor.

8. A method as defined in claim 5, wherein the step of copolymerizing is followed by a step of biaxially stretching the transparent sheet to improve its physical strength.

9. A method as defined in claim 8, wherein:
   in the step of copolymerizing, at least 99.2 mole percent of the monofunctional vinyl monomer is copolymerized with up to 0.8 mole percent neopentylene glycol dimethacrylate; and
   the step of copolymerizing is followed by a step of biaxially stretching the transparent sheet to about 70 percent, to improve its physical strength.

10. A method as defined in claim 8, wherein:
    in the step of copolymerizing, about 98.0 mole percent of the monofunctional vinyl monomer is copolymerized with about 2.0 mole percent neopentylene glycol dimethacrylate; and
    the step of copolymerizing is followed by a step of biaxially stretching the transparent sheet to about 50 percent, to improve its physical strength.

11. A method as defined in claim 5, wherein:
    the method further includes a step of laminating the transparent sheet with one or more additional transparent sheets of either the same or a different composition, to form a laminated structure; and
    the step of using includes a step of orienting the laminated structure with the transparent sheet produced in the step of copolymerizing exposed to the acid environment.

12. A method a defined in claim 5, wherein the monofunctional vinyl monomer used in the step of copolymerizing consists essentially entirely of methyl methacrylate.

13. An aircraft transparency that includes a transparent sheet that consists essentially of the polymerization product of at least 97.5 mole percent of a monofunctional vinyl monomer, of which at least 70 percent is methyl methacrylate, and 0.4 to 2.5 mole percent neopentylene glycol dimethacrylate wherein the sheet is biaxially stretched to improve its physical strength.

14. An aircraft transparency as defined in claim 13, wherein:
    the transparent sheet is stretched by about 70 percent; and
    the transparent sheet consists essentially of the polymerization product of about 99.2 mole percent of the monofunctional vinyl monomer and about 0.8 mole percent of the neopentylene glycol dimethacrylate.

15. An aircraft transparency as defined in claim 13, wherein:
    the transparent sheet is stretched up to about 50 percent; and
    the transparent sheet consists essentially of the polymerization product of about 98.0 mole percent of the monofunctional vinyl monomer and about 2.0 mole percent of the neopentylene glycol dimethacrylate.

16. An aircraft transparency as defined in claim 13, and further including at least one additional transparent sheet laminated with the biaxially-stretched transparent sheet, the transparency being oriented with the biaxially-stretched transparent sheet facing outwardly.

17. A method of producing an aircraft transparency comprising steps of:
    copolymerizing at least 97.5 mole percent of a monofunctional vinyl monomer, of which at least 70 percent is methyl methacrylate, and 0.4 to 2.5 mole percent neopentylene glycol dimethacrylate to produce a transparent sheet; and
    installing the transparent sheet in an aircraft, the sheet being resistant to optical hazing.

18. A method as defined in claim 17, and further including a step of flying the aircraft at an altitude and latitude where minute acidic droplets are present and contact the sheet, the acidic droplets including sulfuric acid caused by the reaction of sulfur dioxide with water vapor.

19. A method as defined in claim 18, wherein:
    the method further includes a step of laminating the transparent sheet with one or more additional transparent sheets of either the same or a different composition, to form a laminated structure; and
    the step of installing includes a step of orienting the laminated structure with the transparent sheet produced in the step of copolymerizing facing outwardly, for exposure to the minute acid droplets.

20. A method as defined in claim 17, wherein the step of copolymerizing is followed by a step of biaxially stretching the transparent sheet to improve its physical strength.

21. A method as defined in claim 20, wherein:
in the step of copolymerizing, at least 99.2 mole percent of the monofunctional vinyl monomer is copolymerized with up to 0.8 mole percent neopentylene glycol dimethacrylate; and
the step of copolymerizing is followed by a step of biaxially stretching the transparent sheet to about 70 percent, to improve its physical strength.

22. A method as defined in claim 20, wherein:
in the step of copolymerizing, about 98.0 mole percent of the monofunctional vinyl monomer is copolymerized with about 2.0 mole percent neopentylene glycol dimethacrylate; and
the step of copolymerizing is followed by a step of biaxially stretching the transparent sheet to about 50 percent, to improve its physical strength.

23. A method as defined in claim 17, wherein the monofunctional vinyl monomer used in the step of copolymerizing consists essentially entirely of methyl methacrylate.

24. An aircraft transparency that includes a transparent sheet consisting essentially of about 99.2 mole percent of a monofunctional vinyl monomer, of which at least 70 percent is methyl methacrylate, and about 0.8 mole percent neopentylene glycol dimethacrylate, wherein the transparent sheet is biaxially stretched by about 70 percent to improve its strength.

25. An aircraft transparency that includes a transparent sheet consisting essentially of about 98.0 mole percent of a monofunctional vinyl monomer, of which at least 70 percent is methyl methacrylate, and about 2.0 mole percent neopentylene glycol dimethacrylate, wherein the transparent sheet is biaxially stretched up to about 50 percent to improve its strength.

26. An aircraft transparency comprising:
a transparent sheet consisting essentially of at least .97.5 mole percent of a monofunctional vinyl monomer, of which at least 70 percent is methyl methacrylate, and 0.4 to 2.5 mole percent neopentylene glycol dimethacrylate, the transparent sheet being biaxially stretched to improve its strength; and
at least one additional transparent sheet laminated with the biaxially-stretched transparent sheet, the transparency being oriented with the biaxially-stretched transparent sheet facing outwardly.

* * * * *